(12) United States Patent
Tanimura et al.

(10) Patent No.: US 6,384,179 B2
(45) Date of Patent: May 7, 2002

(54) POLYACETAL RESIN COMPOSITION

(75) Inventors: Noritaka Tanimura; Tadao Matsushika, both of Kurashiki (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/736,332

(22) Filed: Dec. 15, 2000

(30) Foreign Application Priority Data

Dec. 17, 1999 (JP) ............................................ 11-359217

(51) Int. Cl.[7] ........................ C08G 14/02; C08G 14/14; C08G 16/02
(52) U.S. Cl. ........................ 528/230; 528/239; 528/489; 528/491; 528/499; 525/88; 525/95; 525/98; 525/154; 525/155; 525/232; 525/237; 525/402
(58) Field of Search ................................ 528/230, 239, 528/489, 491, 499; 525/88, 95, 98, 154, 155, 232, 237, 462

(56) References Cited

U.S. PATENT DOCUMENTS 4,795,477 A * 1/1989 Kusumgar et al. ............. 8/471
5,679,743 A * 10/1997 Hirai et al. .................... 525/88

FOREIGN PATENT DOCUMENTS

| DE | 100 61 767 A 1 | 12/2000 |
|----|----------------|---------|
| JP | 3162914        | 7/1991  |
| JP | 06-200117      | 7/1994  |
| JP | 09-094922      | 4/1997  |
| JP | 09-248851      | 9/1997  |
| JP | 09/278983      | 10/1997 |
| JP | 11-320605      | 11/1999 |
| JP | 11-320606      | 11/1999 |

* cited by examiner

Primary Examiner—Duc Truong
(74) Attorney, Agent, or Firm—Birch, Stewart, Kolasch & Birch, LLP

(57) ABSTRACT

A polyacetal resin composition comprising 30–90% by weight of polyacetal copolymer (A) having a melt index of less than 1.0 g/10 min. and 70–10% by weight of polyacetal copolymer (B) having a melt index of 1.0–100 g/10 min., both melting points of (A) and (B) being 155°–162° C., or a difference in melting point between (A) and (B) being not less than 6° C., has distinguished toughness and creep resistance.

26 Claims, No Drawings

POLYACETAL RESIN COMPOSITION

BACKGROUND OF THE INVENTION

The present invention relates to a polyacetal resin composition with distinguished toughness and creep resistance and also to its moldings.

Polyacetal resin has a good balance between the mechanical properties and the physical properties and a distinguished fatigue resistance and also is distiguished in such properties as heat resistance, chemical resistance, electric characteristics, lubricant characteristics, etc. and also in moldability and processability, and thus is used in a wide range of applications such as mechanical parts, automobile parts, electric and electronic parts, etc. as engineering materials. However, in spite of so many fields of application in which the polyacetal resin can utilize its characteristics, the polyacetal resin has not been fully utilized yet in such fields owing to its poor toughness.

Heretofore, attempts have been made to improve the toughness by adding thereto a thermoplastic elastomer such as urethane-based, ester-based, olefin-based elastomers, etc., but there have been still such problems of deterioration of high rigidity and chemical resistance as advantages of polyacetal resin in exchange of the improved toughness. Polyacetal resin has still now limited uses.

U.S. Pat. No. 5,500,447 proposes a polyacetal molding material comprising linear polyoxymethylene (i.e. polyacetal) copolymer having a melt index of not more than 0.8 g/10 min. and ordinary additives, where the toughness is considerably improved without any addition of thermoplastic elastomer thereto due to higher molecular weight attained by the polyoxymethylene copolymer, but the effect on improvement of the toughness is not yet satisfactory and the flowability is largely lowered in exchange of the improved toughness and also moldings with good appearance and high dimensional precision are hard to obtain by ordinary injection molding.

U.S. Pat. No. 5,458,839 proposes a process for producing hollow moldings or sheet-shaped or rod-shaped moldings by blow molding or extrusion molding polyoxymethylene (i.e. polyacetal) copolymer resin in a substantially linear molecular structure having a melt index of 0.1–2.0 g/10 min. U.S. Pat. No. 4,879,085 proposes film formation of polyacetal resin having a melt index of 0.3–5.0 g/10 min. by inflation molding under specific conditions. Both Patents use polyacetal resins having low melt indices to obtain special moldings not by injection molding, which is the most popular procedure for polyacetal resin, but by blow molding, extrusion molding and inflation molding.

This means that it is well known that the toughness will increase with decreasing melt index of polyacetal resin, i.e. with increasing molecular weight, but the flowability will decrease in exchange of the improved toughness and moldings with good appearance and high dimensional precision will be hard to obtain by ordinary injection molding. In other words, no versatile polyacetal resin applicable to every molding procedure can be obtained only by simply making the molecular weight of polyacetal resin higher, and thus a method for improving the toughness while maintaining distinguished flowability and advantages of polyacetal resin so far attained has been keenly desired.

JP-A-8-325431 proposes hinge part made of polyacetal resin by molding a polyacetal resin composition comprising polyacetal resin having a melt index of 0.1–15 g/10 min., core-shell of polymer consisting of core of rubbery polymer and shell of glassy polymer and oxyalkylene polymer, where the hinge characteristics can be improved but toughness. JP-A-9-40842 proposes a method for improving appearance while maintaining the distinguished creep resistance by using a polyacetal resin composition having a melt index of not less than 5 g/10 min. comprising a mixture of polyacetal copolymer having a melt index of not more than 3 g/10 min. and polyacetal copolymer having a melt index of not less than 25 g/10 min., where the appearance can be improved but toughness, and only the creep resistance of polyacetal resin so far attained can be maintained, but no further improvement of creep resistance can be atained.

JP-B-55-39182 proposes improvement of flowability by using a polyacetal resin composition comprising a mixture of two polyoxymethylene copolymer components having different melt indices, where the component having the high melt index of not more than 300 is in proportion of 20–80% by weight to the entire mixture and a quotient obtained by dividing the melt index of the high melt index component by that of the low melt index component is adjusted to 15 or more, but the process still fails to satisfy the improvement of toughness and creep resistance.

SUMMARY OF THE INVENTION

An object of the present invention is to solve the aforementioned problems and provide a polyacetal resin composition with highly improved toughness and creep resistance without any deterioration of advantages of polyacetal resin so far attained such as high rigidity and distinguished moldability and processability and also provide its moldings.

As a result of extensive studies to solve the aforementioned problems, the present inventors have found that a polyacetal resin composition comprising polyacetal copolymer having a melt index of less than 1.0 g/10 min. and polyacetal copolymer having a melt index of 1.0–100 g/10 min., both copolymers having controlled melting points to a specific range, can largely improve the toughness and creep resistance without any deterioration of advantages of polyacetal resin so far attained.

That is, the present invention provides:

[1] A polyacetal resin composition, which comprises 30–90% by weight of polyacetal copolymer having a melt index of less than 1 g/10 min. as Component (A) and 70–10% by weight of polyacetal copolymer having a melt index of 1–100 g/10 min. as Component (B), melting points of Component (A) and Component (B) each being 155°–162° C. or difference in melting point between Component (A) and Component (B) being not less than 6° C.

[2] A polyacetal resin composition as described in said item [1], wherein the melting points of Component (A) and Component (B) each are 157°–161° C. or the difference in melting point between Component (A) and Component (B) is not less than 7° C.

[3] A polyacetal resin composition as described in said item [1] or [2], wherein the composition comprises 40–80% by weight of Component (A) and 60–20% by weight of Component (B).

[4] A polyacetal resin composition as described in any one of said items [1]–[3], wherein the melt index of Component (A) is 0.1–0.8 g/10 min.

[5] A polyacetal resin composition as described in any one of said items [1]–[4], wherein the melt index Component (B) is 2.0–30 g/10 min.

[6] A polyacetal resin composition as described in any one of said items [1]–[5], wherein the melt index of Component (B) is 2.5–10 g/10 min.

[7] A polyacetal resin composition as described in any one of said items [1]–[6], wherein the polyacetal resin composition has a melt index of 1.0–3 g/10 min.

[8] A polyacetal resin composition as described in any one of said items [1]–[7], wherein Component (A) comprises at least one member selected from the group consisting of the following polyacetal copolymers (D), (E) and (F):

(D) polyacetal copolymer, which is a polyacetal copolymer in such a structure that 0.1–5 moles of oxyalkylene units represented by the following formula is inserted into a polymer of oxymethylene repeat unit (—$CH_2O$—) on the basis of 100 moles of the oxymethylene units, where the terminal groups of the polyacetal copolymer are at least one kind of groups selected from the group consisting of an alkoxy group, a hydroxyalkoxy group and a formate group:

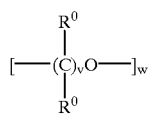

wherein $R^0$s are selected from hydrogen, an alkyl group a substituted alkyl group, an aryl group and a substituted aryl group, and $R^0$s may be the same or different from one another; v is an integer selected from 2 to 6; w is an integer of 1 or more; and a proportion of the oxyalkylene unit at w=1 is not less than 95% by mole to the entire oxyalkylene units, (E) polyacetal copolymer in such a structure that at least one hydrogenated liquid polybutadiene residue, hydroxyalkylated at both ends, with a number average molecular weight of 500–10,000, represented by the following general formula (1) is inserted into one molecule of polyacetal copolymer (D):

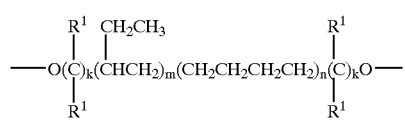
(1)

wherein m=70–98% by mole, n=2–30% by mole and m+n=100% by mole; ($CH_2CH_2CH_2CH_2$) units exist at random or in blocks with respect to [C($CH_2CH_3$)$HCH_2$] units and the [C($CH_2CH_3$)$HCH_2$] units and the ($CH_2CH_2CH_2CH_2$) units may contain unsaturated bonds having an iodine value of not more than 20 g–$I_2$/100 g; k is an integer selected from 2 to 6, and two ks may be the same or different from each other; $R^1$s are selected from hydrogen, an alkyl group, a substituted alkyl group, an aryl group and a substituted aryl group and may be the same or different from one another, and (F) polyacetal copolymer in such a structure that polyacetal copolymer (D) is represented by the following general formula (2):

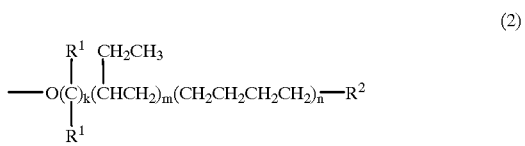
(2)

wherein m, n, k and $R^1$ have the same meanings as defined in the general formula (1); ($CH_2CH_2CH_2CH_2$) units exist at random or in blocks with respect to [C($CH_2CH_3$)$HCH_2$] units, and the [C($CH_2CH_3$)$HCH_2$] units and the ($CH_2CH_2CH_2CH_2$) units may contain unsaturated bonds having an iodine value of not more than 20 g–$I_2$/100 g; and $R^2$ is a group selected from a methyl group, an ethyl group, an n-propyl group and n-butyl group.

[9] A polyacetal resin composition as described in said item [8], wherein Component (A) contains at least one of (E) and (F), and sum total of at least one of (E) and (F) is not less than 10% by weight on the basis of entire Component (A).

[10] A polyacetal resin composition as described in any one of said items [1]–[9], wherein 0.005–5 parts by weight of at least one member selcted from the group consisting of an antioxidant, a formaldehyde-reactive nitrogen-containing polymer or compound, a formic acid-trapping agent, a weather-resistant (light) stabilizer, a mold-releasing (lubricating) agent and a crystal nucleating agent is further contained on the basis of 100 parts by weight of the polyacetal resin composition.

[11] A polyacetal resin composition as described in said item [10], wherein the antioxidant is a hindered phenol-based antioxidant.

[12] A polyacetal resin composition as described in said item [10] or [11], wherein the polymer containing formaldehyde-reactive nitrogen is polyamide resin.

[13] A polyacetal resin composition as described in any one of said items [10]–[12], wherein the formic acid-trapping agent is at least two compounds selected from the group consisting of difatty acid calciums derived from fatty acids having 12–22 carbon atoms.

[14] A polyacetal resin composition as described in any one of said items of [10]–[12], wherein the formic acid-trapping agent is:

(I) an ion adsorbent whose principal component comprises at least two oxides consisting of at least one member selected from oxides of alkali metals and alkaline earth metals and at least one member selected from oxides of trivalent and tetravalent elements, or (II) at least one member selected from hydrotalcites represented by the following general formula:

$[(M^{2+})_{1-x}(M^{3+})_x(OH)_2]^{x+}[(A^{n-})_{x/n} \cdot mH_2O]^{x-}$ where $M^{2+}$ is a divalent metal, $M^{3+}$ is a trivalent metal, $A^{n-}$ is an anion of n valency (n: an integer of 1 or more), x is in a range of $0<x \leq 0.33$, and m is a positive number.

[15] A polyacetal resin composition as described in any one of said items [10]–[14], wherein the mold-releasing agent is at least two compounds selected from the group consisting of ethylene glycol difatty acid esters derived from fatty acids having 12–22 carbon atoms.

[16] A process for producing a polyacetal resin composition as described in any one of said items [1]–[15], which comprises using two continuous bulk polymerization reactors in parallel, producing polyacetal copolymer (A) in one of the reactors while producing polyacetal copolymer (B) in the other reactor at the same time and mixing the polyacetal copolymers (A) and (B) discharged from the respective reactors together before or during post-treatment.

[17] A molding obtained by injection molding, extrusion molding, blow molding or press molding the polyacetal resin composition as described in any one of said items [1]–[15].

[18] A molding as described in said item [17], wherein the molding is at least one part selected from the group consisting of a:mechanism part, an outsert molding resin part, an insert molding resin part, a chassis, a tray and a side plate.

[19] A molding as described in said item [18], wherein the mechanism part is at least one part selected from the group consisting of gears, cams, sliders, levers, arms, clutches, hinges, shafts, bearings, key stems, key tops, shutters and reels.

[20] A molding as described in said item [18], wherein the mechanism part is at least one part selected from the group consisting of parts fitting with and sliding on lead screws for driving pickups of optical disc drive, gears for rotating lead screws, rack gears for driving pickups and gears fitting with rack gears for driving the rack gears.

[21] A molding as described in said item [17], wherein the molding is a part for OA equipment.

[22] A molding as described in said item [17], wherein the molding is a part for camera or video equipment.

[23] A molding as described in said item [17], wherein the molding is a part for music, picture or information equipment.

[24] A molding as described in item [17], wherein the molding is a part for, communication equipment.

[25] A molding as described in said item [17], wherein the molding is an interior or exterior part for automobiles.

[26] A molding as described in said item [17], wherein the molding is a machinery part.

DETAILED DESCRIPTION OF THE INVENTION

The present invention will be described in detail below.

Polyacetal Copolymers

Polyacetal copolymers for use in the present invention include polyacetal copolymer having a melt index, which will be hereinafter referred to as "MI" at times, of less than 1.0 g/10 min., preferably 0.1–0. 9 g/10 min., more preferably 0.2–0.8 g/10 min., determined at 190° C. and 2,160 g according to ASTM-D1238 and polyacetal copolymer having a melt index of 1.0–100 g/10 min., preferably 2.0–30 g/10 min., more preferably 2.5–10 g/10 min., determined likewise at 190° C. and 2,160 g according to ASTM-D1238. The former polyacetal copolymer and the latter polyacetal copolymer will be hereinafter referred to as Component (A) and Component (B), respectively.

When MI of Component (A) and MI of Component (B) are outside the aforementioned ranges, the toughness and creep resistance of the resulting polyacetal resin composition are not improved.

The present polyacetal resin composition resulting from mixing Component (A) and Component (B) together preferably has MI of 1.0–3.0 g/10 min. more preferably 1.0–2.5 g/10 min.

Furthermore, to obtain an improved effect on the toughness and creep resistance of the polyacetal resin composition, melting points of Component (A) and Component (B) must satisfy one of the following relations besides the aforementioned MI conditions.

Firstly, there must be a difference of not less than 6° C., preferably not less than 7° C. in melting point between Component (A) and Component (B). So long as the melting points of Component (A) and Component (B) can be kept at the aforementioned difference, it is not objectionable whether the melting point of Component (A) is higher than that of Component (B) or the melting point of Component (A) is lower than that of Component (B).

Secondly, both melting points of Component (A) and Component (B) must be 155°–162° C., preferably 157°–161° C., which are below the melting points of ordinary polyacetal copolymers.

When the melting points of Component (A) and Component (B) fail to satisfy one of the aforementioned relations, the toughness and creep resistance will not be improved.

A mixing proportion of Component (A) to Component (B) is 30–90% by weight, preferably 40–80% by weight, of Component (A) to 70–10% by weight, preferably 60–20% by weight of Component (B). Above 90% by weight of Component (A), the flowability will be lowered and moldings with good appearance and high dimensional precision cannot be obtained. Below 30% by weight of Component (A), the toughness and creep resistance cannot be improved.

The present polyacetal resin composition can be prepared by kneading Component (A) and Component (B) together through an extruder, etc., or in case Component (A) and Component (B) are in a pellet form, the present polyacetal resin composition can be prepared by simply mixing such pellets. There is no difference in the improved effect of toughness and creep resistance of moldings obtained from any of the thus prepared resin compositions.

Structure of polyacetal copolymers for use in the present invention is not particularly limited, but it is particularly effective to use the following three kinds of polyacetal copolymers (D), (E) and (F).

Description will be made at first of polyacetal copolymer (D) below:

Polyacetal copolymer (D) is a polyacetal copolymer in such a structure that 0.1–5 moles, preferably 0.3–3 moles, of oxy-alkylene units represented by the following formula is inserted into a polymer of oxymethylene repeat units (—CH$_2$O—) on the basis of 100 moles of the oxymethylene repeat units, where terminal groups of the copolymer are at least one kind of groups selected from the group consisting of an alkoxy group, a hydroxyalkoxy group and a formate group:

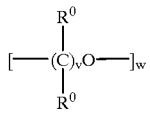

wherein $R^0$s are selected from hydrogen, an alkyl group, a substituted alkyl group, an aryl group and a substituted aryl group, and $R^0$s may be the same or different from one another; v is an integer selected from 2 to 6; w is an integer of 1 or more; and a proportion of the oxyalkylene unit at w=1 is not less than 95% by mole, preferably not less than 96% by more, more preferably not less than 98% by mole to the entire oxyalkylene units.

That is, in the foregoing formula, "w" represents a sequence of oxyalkylene units of polyacetal copolymer, and when a proportion of oxyalkylene units at w=1 is less than 95% by mole to the entire oxyalkylene units, the melting point and heat stability of polyacetal copolymer will be lowered.

When the amount of the inserted oxyalkylene units in the polyacetal copolymer is less than 0.1 mole on the basis of 100 moles of oxymethylene units, the heat stability of polyacetal copolymer will be considerably deteriorated. On the other hand, when the amount of the inserted oxyalkylene units in the polyacetal copolymer exceeds 5 moles on the basis of 100 moles of oxymethylene units, the rigidity as an advantage of polyacetal copolymer will be deteriorated.

Preferably, alkoxy groups as the terminal groups of polyacetal copolymer include methoxy, ethoxy, propyloxy, isopropyloxy and butoxy, and preferable hydroxyalkoxy groups include hydroxyethoxy and hydroxybutoxy. Other terminal groups than alkoxy groups, hydroxyalkoxy groups and formate groups, such as hydroxy (—OH), acetyl (—OCOCH$_3$), etc. are not preferable, because the heat stability of polyacetal copolymer becomes poor.

Description will be made of polyacetal copolymer (E) below:

Polyacetal copolymer (E) is a polyacetal copolymer in such a structure that at least one hydrogenated liquid polybutadiene residue, hydroxyalkylated at both ends, with a number average molecular weight of 500–10,000, represented by the following general formula (1) is inserted into one molecule of polyacetal copolymer (D) as a block component:

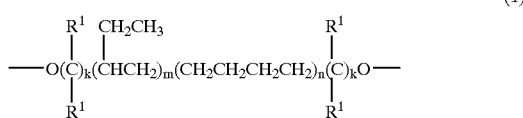

(1)

where m=70–98% by mole, n=2–30% by mole and m+n=100% by mole; (CH$_2$CH$_2$CH$_2$CH$_2$) units exist at random or in blocks with respect to [C(CH$_2$CH$_3$)HCH$_2$] units, and the [C(CH$_2$CH$_3$)HCH$_2$] units and the (CH$_2$CH$_2$CH$_2$CH$_2$) units may contain unsaturated bonds having an iodine value of not more than 20 g–I$_2$/100 g; k is an integer selected from 2 to 6 and two ks may be the same or different from each other; R$^1$s are selected from hydrogen, an alkyl group, a substituted alkyl group, an aryl group and a substituted aryl group and may be the same or different from one another.

Description will be made of polyacetal copolymer (F) below:

Polyacetal copolymer (F) is a polyacetal copolymer in such a structure that one end of polyacetal copolymer (D) is represented by the following general formula (2).

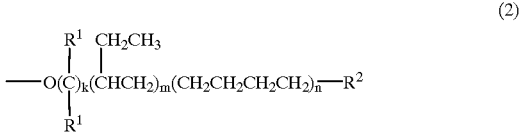

(2)

where m, n, k and R$^1$ have the same meanings as defined in the general formula (1); (CH$_2$CH$_2$CH$_2$CH$_2$) units exists at random or in blocks with respect to [C(CH$_2$CH$_3$)HCH$_2$] units, and the [C(CH$_2$CH$_3$)HCH$_2$] units and the (CH$_2$CH$_2$CH$_2$CH$_2$) units may contain unsaturated bonds having an iodine value of not more than 20 g–I$_2$/100 g; and R2 is a group selected from a methyl group, an ethyl group, an n-propyl group and n-butyl group.

These polyacetal copolymers (D), (E) and (F) can be used alone or in a mixture of two or three thereof at the same time.

In the present invention, it is effective to use at least one of these polyacetal copolymers (D), (E) and (F) for Component (A) having MI of less than 1.0 g/10 min., and it is particularly preferably to use polyacetal copolymers (E) and (F) in a proportion of [(E)+(F)] of not less than 10% by weight to the entire Component (A).

Well known processes can be used as typical processes for producing the polyacetal copolymer for use in the present invention, and a preferable process comprises polymerizing trioxane, cyclic ether and/or cyclic formal and a chain transfer agent for adjusting MI (molecular weight) in the presence of at least one cationically active catalyst as a polymerization catalyst.

Cyclic ether and/or cyclic formal typically include ethylene oxide, propylene oxide, oxetane, tetrahydrofurane, 1,3-dioxolane, trioxepan, 1,4-butanediolformal, etc. Above all, 1,3-dioxolane or 1,4-butanediolformal is more preferable, and further 1,3-dioxolane is particularly preferable, because it is polymerizable even in the presence of a small amount of a cationically active catalyst, whereby side reactions causing lowering of molecular weight of polymer can be suppressed and also lowering of molecular weight by decomposition of polymers due to the polymerization catalyst can be suppressed, that is, polyacetal copolymer of very high molecular weight having MI of less than 1.0 g/10 min. as Component (A) of the present invention can be easily obtained.

Furthermore, 1,3-dioxolane is preferable because it also can make a proportion of w=1, which shows the sequence of oxyalkylene units of polyacetal copolymer as so far described as regards polyacetal copolymer (D), not less than 95% by mole on the basis of entire oxyalkylene units. That is, polyacetal copolymer (D) can be obtained thereby, and decomposition of polymer by the residual catalyst can be less at the same time, resulting in formation of polyacetal copolymer with a distinguished heat stability.

To further improve the heat stability of polyacetal copolymer and also conduct polymerization reaction stably, it is preferable to make the content of 2-methyl-1,3-dioxolane not more than 500 ppm by weight, the content of 1,4-dioxane not more than 200 ppm by weight, the content of acetaldehyde not more than 2,000 ppm by weight and the content of a peroxide in terms of hydrogen peroxide not more than 15 ppm by weight. Furthermore, to suppress increase in peroxide by oxidation, it is preferable to use 1,3-dioxalane containing 10–500 ppm by weight of at least one hindered phenol-based antioxidant.

Melting point of polyacetal copolymer can be controlled by adjusting an amount of cyclic ether and/or cyclic formal to be used. An amount of cyclic ether and/or cyclic formal to be used in the present invention is preferably 0.1–15 moles, more preferably 0.3–10 moles on the basis of 100 moles of trioxane. When the amount is less than 0.1 mole on the basis of 100 moles of trioxane, the heat stability of the resulting polyacetal copolymer will be extremely lowered, whereas above 15 moles the rigidity of polyacetal copolymer will be deteriorated.

When trioxane or cyclic ether and/or cyclic formal contains a large amount of impurities containing active hydrogen (hydrogen of OH) such as water, methyl alcohol, formic acid, etc., the impurities undergo chain transfer reactions during the polymerization, resulting in formation of polymers of lower molecular weight. That is, polyacetal copolymer having MI of less than 1.0 g/10 min of the present invention [Component (A)] will be hard to obtain. Furthermore, when the impurities containing active hydrogen (hydrogen of OH) such as water, methyl alcohol, formic acid, etc. undergo chain transfer reactions, an unstable terminal group [—(OCH$_2$)n—OH group] is formed during the polymerization, thereby lowering the heat stability of polyacetal copolymer.

To prevent lowering of the molecular weight and formation of the unstable terminal group during the polymerization, it is necessary to make concentrations of impurities containing active hydrogen such as water, methyl alcohol, formic acid, etc. in trioxane or comonomers as low as possible by distillation, adsorption, etc. Practically, it is preferable that upon conversion of concentrations of impurities containing active hydrogen to water concentrations, respectively, the total water concentration is not more than 20 ppm by weight on the basis of sum total of trioxane and cyclic ether and/or cyclic formal. Conversion to water concentrations can be attained, specifically, by multiplying a methyl alcohol concentration by 0.28 in case of methyl alcohol and a formic acid concentration by 0.20 in case of formic acid.

Reduction of impurities having an adverse effect on the polymerization reaction or heat stability of polyacetal copolymer contained in trioxane or comonomers such as 1,3-dioxolane, etc. can be carried out, in case of trioxane, by methods disclosed, for example, in JP-A-3-123777 and JP-A-7-33761 and, in case of 1,3-dioxolane, by methods disclosed, for example, in JP-A-49-62469 and JP-A-5-271217.

Preferable polymerization catalyst includes cationically active catalysts such as Lewis acids, protonic acids and esters or anhydrides thereof, or the like. Lewis acids include, for example, halides of boron, tin, titanium, phosphorus, arsenic and antimony, and specifically boron trifluoride, tin tetrachloride, titanium tetrachloride, phosphorus pentafluoride, phosphorus pentachloride, antimony pentafluoride and complex compounds or salts thereof. Specific examples of protonic acids and esters or anhydrides thereof include perchloric acid, trifluoromethanesulfonic acid, t-butyl ester perchlorate, acetyl perchlorate, trimethyloxonium hexafluorophosphate, etc., Above all, boron trifluoride, boron trifluoride hydrate and coordination complex compounds of an organic compound containing an oxygen atom or a sulfur atom and boron trifluoride are preferable, and preferable specific examples include boron trifluoride diethyl ether and boron trifluoride di-n-butyl ether. An amount of the cationically active catalyst to be used is preferably $1 \times 10^{-8} – 1 \times 10^{-4}$ mole on the basis of one mole of total monomers. An amount of boron trifluoride diethyl ether or boron trifluoride di-n-butylether to be used as a polymerization catalyst is preferably $8 \times 10^{-6} – 8 \times 10^{-5}$ mole, more preferably $1 \times 10^{-5} – 5 \times 10^{31\ 5}$ mole on the basis of one mole of total monomers. Too small an amount of the polymerization catalyst is not preferable, because the polymerization yield will be lowered to decrease the productivity, whereas too large an amount of the polymerization catalyst is not preferable, because it will cause side reactions of forming polymers of lower molecular weights to take place more often during the polymerization, and Component (A) having MI of less than 1 g/10 min. of the present invention will be hard to obtain. Furthermore, the heat stability of the resulting polyacetal copolymer will be lowered due to the increased amount of residual polymerization catalyst.

In the present invention, polymerization is carried out upon addition of a chain transfer agent thereto to adjust MI (molecular weight). The smaller an amount of a chain transfer agent, the lower MI (i.e. the higher a molecular weight), whereas the larger an amount of the chain transfer agent, the higher MI (i.e. the lower a molecular weight). The kind of chain transfer agents to be used is not particularly limited, and any well known transfer agents can be used, so long as they function as chain transfer agents of cationic polymerization. To obtain polyacetal copolymers (D), (E) and (F) so far described, it is necessary to use specific chain transfer agents as will be explained below.

Chain transfer agents for use to obtain polyacetal copolymer (D) include formaldehyde dialkyl acetals whose alkyls are selected from lower aliphatic groups such as methyl, ethyl, propyl, isopropyl, butyl, etc. and oligomers thereof, polyalkylene glycols having a molecular weight of not more than 3,000 such as polyethylene glycol, polypropylene glycol, etc., and lower aliphatic alcohols such as methyl alcohol, ethyl alcohol, propyl alcohol, isopropyl alcohol, butyl alcohol, etc. Above all, dialkylacetals are preferable, and methylal and butyral are particularly preferable.

Description will be made of the terminal groups of the resulting polyacetal copolymer below:

Terminal groups of polyacetal copolymer are formed by chain transfer reactions of the aforementioned chain transfer agents or chain transfer agents entrained in polymerization of raw materials such as trioxane, cyclic ether and/or cyclic formal, polymerization catalyst etc. For example, chain transfer of methylal forms methoxy terminal groups, chain transfer of butyral forms butoxy terminal groups, chain transfer of methyl,alcohol forms a methoxy terminal group and a thermally unstable hydroxyl terminal group [—(OCH$_2$)$_n$—OH], and chain transfer of water forms hydroxyl terminal group. Chain transfer of methyl formate contained in trioxane as impurities forms a formate terminal group and a methoxy terminal group. Beside the chain transfer reactions, side reactions (hydride shift) taking place during the polymerization form methoxy terminal groups and formate terminal groups. The thermally unstable hydroxyl terminal groups can be decomposed and removed by heat treatment in the post-treatment step as will be described in detail later, and stabilized as hydroxyalkoxy terminal groups.

As described above, the terminal groups of the present polyacetal copolymer (D) will be ultimately composed mainly of alkoxy groups, hydroxyalkoxy groups and formate groups. When no chain transfer agent is used, chain transfer reactions of only a small amount of chain transfer agents entrained in the polymerization of raw materials take place, and thus polyacetal copolymer having very low MI (high molecular weight) can be obtained, but the terminal groups of the ultimately obtained polyacetal copolymer will be also composed mainly of the same alkoxy groups, hydroxyalkoxy groups and formate groups as aforementioned.

To obtain polyacetal copolymer (E), hydrogenated liquid polybutadiene, hydroxyalkylated at both ends, with a number average molecular weight of 500–10,000, represented by the following general formula (3) must be used as a chain transfer agent in place of the chain transfer agents used in the formation of polyacetal copolymer (D):

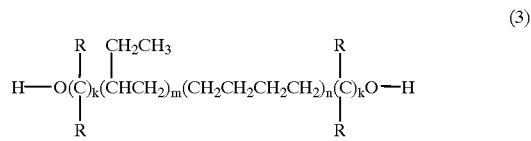

(3)

where the same definition as used in the general formula (1) are applied to definitions of general formula (3).

By using the hydrogenated liquid polybutadiene of general formula (3) as a chain transfer agent, polyacetal copolymer containing at least one of the hydrogenated liquid polybutadiene represented by general formula (1) is inserted as a block component into one molecule of polyacetal copolymer.

To obtain polyacetal copolymer (F), hydrogenated liquid polybutadiene, hydroxyalkylated at one end, with a number average molecular weight of 500–10,000, represented by the following general formula (4) must be used as a chain transfer agent in place of the chain transfer agents used in the formation of polyacetal copolymer (D):

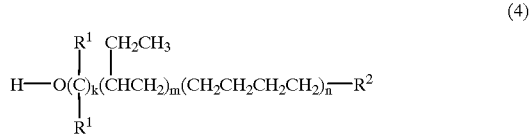

(4)

where the same definitions as used in the general formula (2) is applied to definitions of general formula (4).

By using the hydrogenated liquid polybutadiene of general formula (4) as a chain transfer agent, polyacetal copolymer whose one end is in a structure represented by general formula (2) can be obtained.

So far description has been made of chain transfer agents for obtaining polyacetal copolymer (D), (E) or (F). When these chain transfer agents are used each alone, corresponding polyacetal copolymer (D), (E) or (F) to the chain transfer agent used can be obtained. On the other hand, when these chain transfer agents are used not each alone, but in combination, mixtures of corresponding polyacetal copolymers (D), (E) and (F) to the chain transfer agents used in combination can be obtained. For example, when methylal and hydrogenated liquid polybutadiene, hydroxyalkylated at both ends, of general formula (3) are used together, a mixture of polyacetal copolymers (D) and (F) can be obtained.

Furthermore, when a molar ratio of the methylal to the hydrogenated liquid polybutadiene, hydroxyalkylated at both ends, is at 1:1, a mixture of polyacetal copolymers (D) and (E) in a ratio of 1:1 by weight can be obtained. By controlling combinations of chain transfer agents and their combining ratios, mixtures of polyacetal copolymers (D), (E) and (F) in any desired ratios can be simply obtained at the polymerization stage. Needless to say, even single polymerization of polyacetal copolymers (D), (E) and (F), followed by mixing, will be also satisfactory, because it gives no difference to the effect of the present invention.

Polymerization procedure is not particularly limited. For example, bulk polymerization can be used, irrespective of batch and continuous types. In the bulk polymerization, it is usual to use monomers in a molten state and obtain solid bulk polymers in progress of polymerization. In the present invention, continuous bulk polymerization reaction is preferable from the economical viewpoint, and self-cleaning type extruder-mixers such as a cokneader, a biaxial screw type continuous extruder-kneader, a biaxial paddle-type, continuous mixer, etc. can be used as a continuous bulk polymerization apparatus.

When polyacetal copolymer for use in the present invention is produced by continuous bulk polymerization reaction in a self-cleaning type, biaxial continuous polymerization reactor with a jacket for controlling temperature as a polymerization apparatus, the following points must be taken into consideration. In case of producing the present polyacetal copolymer (B), the polyacetal copolymer can be continuously and stably produced in high polymerization yield according to the well known procedures of controlling screw dimensions or paddle pattern and paddle shape of polymerization apparatus, number of revolutions per minute of screw or paddle of polymerization apparatus, residence time of monomers and polymers in the polymerization apparatus, jacket temperature, etc. On the other hand, in case of the present polyacetal copolymer (A), the polyacetal copolymer sometimes cannot be continuously and stably produced even if the aforementioned well known procedures are used, because MI is less than 1.0 g/10 min. and the molecular weight is very high. Specifically, there are such problems that the load on the polymerization apparatus is increased to an overload to discontinue the continuous operation or the polymerization apparatus goes beyond the allowable torque, damaging to the polymerization apparatus in the worst case.

In such cases, the problems can be overcome by adding a small amount of hydrogenated liquid polybutadiene, hydroxyalkylated at both ends, represented by the aforementioned general formula (3) and/or hydrogenated liquid polybutadiene, hydroxyalkylated at one end, represented by the aforementioned general formula (4), thereto during the polymerization. The time of addition is not particularly limited, so long as the addition is made before the start of polymerization. In other words, the hydrogenated liquid polybutadiene must be present during the polymerization reaction. That is, it can be added to trioxane, or cyclic ether and/or cyclic formal or mixture thereof in advance or it can be separately fed to the polymerization apparatus, when trioxane or cyclic ether and/or cyclic formal is fed to the polymerization apparatus.

Furthermore, hydrogenated liquid polybutadiene, hydroxyalkylated at both ends [general formula (3)] or at one end [general formula (4)] can be dissolved in an inactive organic solvent such as cyclohexane, benzene, toluene, 1,4-dioxane, etc. and the resulting solution can be used. Furthermore, hydrogenated liquid polybutadienes, hydroxyalkylated at both ends [general formula (3)] and at one end [general formula (4)] can be used each alone or together. An amount of the hydrogenated liquid polybutadiene(s) is 0.02–2% by weight, preferably 0.05–1% by weight, more preferably 0.1–0.5% by weight, on the basis of sum total of trioxane and cyclic ether and/or cyclic formal. Too small an amount leads to an unsatisfactory load on the polymerization apparatus and an unsatisfactory effect on torque reduction, whereas too large an amount leads to unsatisfactory formation of polyacetal copolymer (A) having MI of less than 1.0 g/10 min. and an increasing tendency to form the unstable terminal group in the resulting polyacetal copolymer.

Polyacetal copolymer containing polyacetal copolymer (E) and/or polyacetal copolymer (F), as so far described above, can be obtained by polymerization in the presence of hydrogenated liquid polybutadiene, hydroxyalkylated at both ends of general formula (3) and/or hydrogenated liquid polybutadiene, hydroxyalkylated at one end of general formula (4), and consequently the effect of the present invention, i.e. improvement of the toughness and creep resistance, can be easily attained, and further problems of load on the polymerization apparatus and torque increase encountered when the polyacetal copolymer having MI of less than 1.0 g/10 min. is produced can be overcome, continuous bulk polymerization can be thereby carried out stably. In this manner, the polyacetal copolymer containing polyacetal copolymer (E) and/or polyacetal copolymer (F) is very preferable.

Description will be made of procedures for post-treating polyacetal copolymer obtained by polymerization below:

Active polymerization catalyst remain on the polyacetal copolymer obtained by the polymerization reaction and thus must be deactivated. Deactivation of the polymerization catalyst is carried out by placing the catalyst in an aqueous solution and/or an organic solvent containing at least one of catalyst neutralizing-deactivating agents such as ammonia, amines (e.g. triethylamine, tri-n-butyl-amine, etc.), boric acid compounds, quaternary ammonium compounds, hydroxides, inorganic acid salts, organic acid salts, etc. of alkali metals or alkaline earth metals, followed by stirring in a slurry state usually for a few minutes to a few hours. Deactivation temperature is usually 0°–80° C., and preferably 45°–60° C. for effectively carrying out the neutralization-deactivation of the polymerization catalyst.

Slurry of the neutralized-deactivated catalyst is filtered and dried, but, if necessary, washing can be carried out before the drying to remove unreacted monomers, catalyst neutralizing-deactivating agent and neutralized-deactivated catalyst salts. Furthermore, the following procedures can be also carried out: a procedure for deactivating the polymerization catalyst by contacting vapors of ammonia, triethylamine, etc. with the polyacetal copolymers resulting from the polymerization, and a procedure for deactivating the polymerization catalyst by contacting at least one of hindered amines, triphenylphosphine, calcium hydroxide, a boric acid compound, a quaternary ammonium compound or the like with the polyacetal copolymers. The aforementioned deactivation operation can be carried out several times.

When the polymerization catalyst is used in a small amount, the aforementioned procedures for deactivating the polymerization catalyst can be replaced by a procedure of heating the polyacetal copolymer resulting from the polymerization at a lower temperature than the melting point in an inert gas atmosphere to volatize and remove the polymerization catalyst.

The deactivation operation of polymerization catalyst remaining on the polyacetal copolymer or volatile removal operation of the polymerization catalyst can be carried out, if necessary, after pulverization of the polyacetal copolymer resulting from the polymerization.

Furthermore, the polyacetal copolymer resulting from the polymerization catalyst deactivation operation still has thermally unstable terminal groups (—(OCH$_2$)$_n$—OH groups), and thus it is necessary to decompose and remove the unstable terminal groups. The polyacetal copolymer having unstable terminal groups can be stabilized by carrying out decomposition and removal of the unstable terminal groups, where the unstable terminal groups are decomposed zipperwise and the zipper-wise decomposition is stopped at the site of oxyalkylene units inserted in the polyacetal copolymer to become hydroxyalkoxy groups as stable terminal groups.

Procedure for decomposing and removing the unstable terminal groups includes, for example, a procedure for decomposing and removing the unstable terminal groups by using a monoaxial screw-type extruder with a vent, a biaxial screw-type extruder with a vent or the like and melting polyacetal copolymer in the presence of a basic compound capable of decomposing the unstable terminal groups such as ammonia, aliphatic amines (e.g. triethylamine, tributylamine, etc.), hydroxides, inorganic weak acid salts, organic weak acid salts, etc. of alkali metals or alkaline earth metals (typically calcium hydroxide). The aforementioned basic compound can be used together with water or methanol, or at least two basic compounds can be used together.

The most preferable procedure for decomposing and removing the unstable terminal groups in the present invention is a procedure of heat treating polyacetal copolymer in a molten state in the presence of a specific quaternary ammonium compound, represented by the following general formula (5), as a catalyst for decomposing and removing the unstable terminal groups, where polyacetal copolymer substantially free from the unstable terminal groups, can be obtained in the shortest time by using a minimum amount of the quaternary ammonium compound. This procedure is most suitable for producing polyacetal copolymer having very low MI (i.e. very high molecular weight) because the polymer molecular weight is never lowered due to decomposition of polymer main chain during the treatment.

$$[R^4R^5R^6R^7N^+]_n X^{-n} \tag{5}$$

where $R^4$, $R^5$, $R^6$ and $R^7$ independently represent an unsubstituted or substituted alkyl group having 1–30 carbon atoms; or aryl group having 6–20 carbon atoms; an aralkyl group consisting of an unsubstituted or substituted alkyl group having 1–30 carbon atoms with at least one aryl group having 6–20 carbon atoms as a substituent; and an alkylaryl group consisting of an aryl group having 6–20 carbon atoms with at least one unsubstituted or substituted alkyl group having 1–30 carbon atoms as a substituent; and the unsubstituted or substituted alkyl group are straight, branched or cylic; the substituent of the substituted alkyl group is halogen, an aldehyde group, a carboxyl group, an amino group or an amide group; hydrogen atom of the unsubstituted alkyl group, aryl group, aralkyl group and alkylaryl group may be substituted by halogen; n is an integer of 1–3; and X represents a hydroxyl group or a residue of carboxylic acid having 1–20 carbon atoms, other hydroacid than hydrogen halide, an oxo-acid, inorganic thio acid or an organic thio acid having 1–20 carbon atoms.

It is preferable that $R^4$, $R^5$, $R^6$ and $R^7$ of general formula (5) are independently an alkyl group having 1–5 carbon atoms and a hydroxyalkyl group having 2–4 carbon atoms, and furthermore it is particularly preferable that at least one of $R^4$, $R^5$, $R^6$ and $R^7$ is a hydroxyethyl group. Specifically, the quaternary ammonium compound includes hydroxides; salts of hydroacids such as hydrochloric acid, hydrobromic acid, hydrofluoric acid, etc.; salts of oxo-acids such as sulfuric acid, nitric acid, phosphoric acid, carbonic acid, boric acid, chloric acid, iodic acid, silicic acid, perchloric acid, chlorous acid, hypochlorous acid, chlorosulfuric acid, amidosulfuric acid, disulfuric acid, tripolyphosphoric acid, etc.; salts of thio acids such as thiosulfuric acid; salts of carboxylic acids such as formic acid, acetic acid, propionic acid, butanoic acid, isobutyric acid, pentanoic acid, capronic acid, caprylic acid, capric acid, benzoic acid, oxalic acid, etc. or the like, of tetramethylammonium, tetraethylammonium, tetrapropylammonium, tetra-n-butylammonium, cetyltrimethylammonium, tetradecyltrimethylammonium, 1,6-hexamethylene-bis (trimethylammonium), decamethylene-bis (trimethylammonium), trimethyl-3-chloro-2-hydroxypropylammonium, trimethyl(2-hydroxyethyl) ammonium, triethyl(2-hydroxyethyl)ammonium, tripropyl (2-hydroxyethyl)ammonium, tri-n-butyl(2-hydroxyethyl) ammonium, trimethylbenzylammonium, triethylbenzylammonium, tripropybenzylammonium, tri-n-butylbenzylammonium, trimethylphenylammonium, triethylphenylammonium, trimethyl-2-oxyethylammonium, monomethyltrihydroxyethylammonium, monoethyltrihydroxyethylammonium, octadecyl(2-hydroxyethyl)ammonium, tetrakis' (hydroxyethyl) ammonium, etc., among which hydroxide (OH$^-$) and salts of sulfuric acid (HSO$_4^-$ and SO$_4^{2-}$), carbonic acid (HCO$_3^-$ and CO$_3^{2-}$), boric acid (B(OH)$_4^-$) and carboxylic acids are preferable. Among carboxylic acids, formic acid, acetic acid and propionic acid are particularly preferable. These quaternary ammonium compounds can be used alone or in combination of at least two thereof.

In addition to the aforementioned quaternary ammonium compound, ammonia or amines such as triethylamine, etc. as so far well known unstable terminal group-decomposing agents as mentioned above can be also used together. An amount of the quaternary ammonium compound to be used is preferable 0.05–50 ppm by weight in terms of the ammount of nitrogen originating from the quaternary ammonium compound, represented by the following formula (6) on the basis of sum total weight of polyacetal copolymer and quaternary ammonium compound:

$$P \times 14/Q \qquad (6)$$

where P shows an amount of quaternary ammonium compound on the basis of sum total weight of polyacetal copolymer and quaternary ammonium compound (ppm by weight); "14" shows the atomic weight of nitrogen; and Q shows the molecular weight of quaternary ammonium compound.

When the quaternary ammonium compound is used in an amount less than 0.05 ppm by weight, the decomposition rate of unstable terminal groups will be lowered, whereas above 50 ppm by weight color tone of polyoxymethylene copolymer resulting from the decomposition of unstable terminal groups will be deteriorated. Preferable heat treatment is carried out at a resin temperature from the melting point of the copolymer to 260° C. in an extruder, a kneader, etc. Above 260° C. there will be a coloring problem and a problem of decomposition of polymer main chain (formation of low molecular weight polymers). Formaldehyde generated by decomposition is removed under reduced pressured. A procedure of adding the quaternary ammonium compound is not particularly limited. That is, a procedure of adding it as an aqueous solution in the step of deactivating the polymerization catalyst, a procedure of spraying it onto the polyacetal copolymer before melting, a procedure for adding it after the melting, etc. are available. Any of these procedures can be used, so long as to quaternary ammonium compound is present in the step of heat treating the polyacetal copolymer.

It is very suitable for efficiently obtaining the present polyacetal resin composition to use continuous bulk polymerization apparatuses in parallel. Specifically, two continuous bulk polymerization apparatuses are operated at the same time to continuously produce Component (A) in one polymerization apparatus and Component (B) in another polymerization apparatus, and then Component (A) and Component (B) discharged from the respective polymerization apparatuses are mixed together. The ratio of Component (A) to Component (B) after the mixing can be simply adjusted by controlling production rates of the two polymerization apparatuses. Mixing of discharged Component (A) with discharged Component (B) can be carried out just after the polymerization (before the post-treatment) or during the post-treatment step, for example, at the same time as the deactivation treatment of polymerization catalyst or drying treatment, or after the deactivation and drying treatments. When the mixing is completed before the decomposition-removal treatment of the unstable terminal groups, the present polyacetal resin composition can be obtained in a pellet form after the decomposition-removal treatment of the unstable terminal group. Furthermore, the mixing can be carried out at the same time as the decomposition-removal treatment of the unstable terminal groups, whereby the present polyacetal resin composition can be directly obtained, unnecessitating, for example, mixing of pellets themselves. Thus, this procedure is very advantageous.

Additives

Description has been so far made of the present polyacetal resin composition and polyacetal copolymers for use in the present invention. A practical polyacetal resin composition can be obtained by mixing the present polyacetal resin composition with appropriate additives depending upon desired uses. Specifically, such a polyacetal resin composition can be provided, which contains 0.005–5 parts by weight of at least one member selected from the group consisting of an antioxidant, a formaldehyde-reactive nitrogen-containing polymer or compound, a formic acid-trapping agent, a weather-resistant (light) stabilizer, a mold-releasing (lubricating) agent and a crystal nucleating agent on the basis of 100 parts by weight of the polyacetal resin composition. These additives are added to the polyacetal copolymer resulting from the decomposition-removal of the unstable terminal groups, but can be added, depending upon additives, at the same time as the decomposition-removal treatment of the unstable terminal groups.

Antioxidant is preferably a hindered phenol based antioxidant, which specifically includes, for example, n-octadecyl-3-(3',5'-di-t-butyl-4'-hydroxyphenyl) propionate, n-octadecyl-3-(3'-methyl-5'-t-butyl-4'-hydroxyphenyl) propionate, n-tetradecyl-3(3',5'-di-t-butyl-4'-hydroxyphenyl) propionate, 1,6-hexanediol-bis[3-(3,5-di-t-butyl-4-hydroxyphenyl)propionate], 1,4-butanediol-bis[3-(3,5-di-t-butyl-4-hydroxyphenyl) propionate], triethyleneglycol-bis[3-(3-t-butyl-5-methyl-4-hydroxyphenyl) propionate], 2,2'-methylene-bis(4-methyl-t-butylphenol), tetrakis[methylene-3-(3',5'-di-t-butyl-4'-hydroxyphenyl) propionate]methane, 3,9-bis[2-{3-(3-t-butyl-4-hydroxy-5-methylphenyl)propionyloxy}-1,1-dimethylethyl]2,4,8,10-tetraoxaspiro (5,5) undecane, N,N'-bis-[3-(3',5'-di-t-butyl-41-hydroxyphenyl)] propionylhexamethylenediamine, N,N'-tetramethylene-bis-3-(3'-methyl-5'-t-butyl-4'-hydroxyphenyl)] propionyldiamine, N,N'-bis-[3-(3,5-di-t-butyl-4-hydroxyphenyl) propionyl] hydrazine, N-salicyloyl-N'-salicylidenehydrazine, 3-(N-salicyloyl)amino-1,2,4-triazole, N,N'-bis-[2-{3-(3,5-di-t-butyl-4-hydroxyphenyl) propionyloxy}ethyl]oxymide, etc.

Preferable are triethyleneglycol-bis-[3-(3-t-butyl-5-methyl-4-hydroxyphenyl)-propionate] and tetrakis [methylene-3-(3',5'-di-t-butyl-4'-hydroxyphenyl) propionate] methane. These antioxidants can be used alone or in combination of at least two thereof. It is more preferable to add 0.01–1 part by weight of the antioxidant to 100 parts by weight of the polyacetal resin composition.

Formaldehyde-reactive nitrogen-containing polymer or compound includes polyamide resins such as nylon 4-6, nylon 6, nylon 6-6, nylon 6-10, nylon 6-12, nylon 12, etc. and their copolymers such as nylon 6/6–6/6-10, nylon 6/6-12, etc., and further includes acrylamide and its derivatives, copolymers of acrylamide and its derivatives with other vinyl monomers, and formaldehyde-reactive nitrogen atom-containing compounds with an amino substituent. Examples of copolymers of acrylamide and its derivatives with other vinyl monomers include poly-β-alanine copolymers obtained by polymerization of acrylamide and its derivatives with other vinyl monomers in the presence of a metal alcoholate.

Formaldehyde-reactive nitrogen atom-containing compound with an amino substituent includes, for example, triazine derivatives such as guanamine (2,4-diamino-symtriazine), melamine (2,4,6-triamino-sym-triazine), N-butylmelamine, N-phenymelamine, N,N-diphenylmelamine, N,N',N"-triphenylmelamine, N,N-diallylmelamine, N-methylolmelamine, N,N',N"-trimethylolmelamine, benzoguanamine (2,4-diamino-6-phenyl-sym-triazine), acetoguanamine (2,4-diamino-6-methyl-sym-triazine), 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, 2,4-dioxy-6-amino-sym-triazine, 2-oxy-4,6-diamino-sym-triazine;, N,N,N',N'-tetracyanoethylbenzoguanamine, succinoguanamine, ethylenedimelamine, triguanamine, melamine cyanurate, ethylenedimelamine cyanurate, triguanamine cyanurate, ammeline, acetoguanamide,.etc. These formaldehyde-reactive nitrogen-containing polymers or compounds can be used alone or in combination of at least two thereof. Among the formaldehyde-reactive nitrogen-containing polymers or compounds, polyamide resins are preferable. A proportion thereof is more preferably 0.01–1 part by weight on the basis of 100 parts by weight of the polyacetal resin composition.

Formic acid-trapping agent includes the aforementioned amine-substituted triazines and copolycondensates of amino-substituted triazine with formaldehyde, for example melamine-formaldehyde polycondensates. Other formic acid-trapping agents include hydroxides, inorganic acid salts, carboxylic acid salts, and alkoxides of alkalimetals and alkaline earth metals, which are, for example, hydroxides of sodium, potassium, magnesium, calcium, barium, etc., and carbonates, phosphates, silicates, borates and carboxylates of these metals. Preferable carboxylic acids are saturated or unsaturated aliphatic carboxylic acids having 10–36 carbon atoms, and can have a hydroxyl group as a substituent.

Aliphatic carboxylic acid includes, for example, capric acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid, lacceric acid, undecylenic acid, oleic acid, elaidic acid, cetoleic acid, erucic acid, brassidic acid, sorbic acid, linolic acid, linolenic acid, arachidonic acid, propiolic acid, stearolic acid, 12-hydroxydodecanoic acid, 3-hydroxydecanoic acid, 16-hydroxyhexadecanoic acid, 10-hydroxyhexadecanoic acid, 12-hydroxyoctadecanoic acid (12-hydroxystearic acid), 10-hydroxy-8-octadecanoic acid, dl-erythro-9,10-dihydroxyoctadecanoic acid, etc.

Above all, difatty acid calciums derived from fatty acids having 12–22 carbon atoms are preferable and include, for example, calcium dimyristinate, calcium dipalmitate, calcium diheptadecylate, calcium distearate, calcium di-12-hydroxystearate, calcium (myristate-palmitate), calcium (myristate-stearate), calcium (palmitate-stearate), etc. Particularly preferable are calcium dipalmitate, calcium diheptadecylate, calcium distearate and calcium di-12-hydroxystearate. In the present invention, it is preferable to use a combination of at least two members selected from the group consisting of the aforementioned difatty acid calciums derived from fatty acids having 12–22 carbon atoms, and a mixing proportion thereof is more preferably 0.005–0.2 parts by weight on the basis of 100 parts by weight of the polyacetal resin composition.

Other formic acid-trapping agents include at least one member selected from:
(I) An ion adsorbent comprising, as main components, at least two oxides selected from at least one of oxides of alkali metals and alkaline earth metals as one component and at least one of oxides of trivalent and tetravalent elements as another component, and
(II) Hydrotalcites represented by the following general formula:

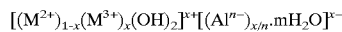

where $M^{2+}$ is a divalent metal, $M^{3+}$ is a trivalent metal, $A^{n-}$ is an anion with a valency of n (n is an integer of 1 or more), x is in a range of $0<x \leq 0.33$, and m is a positive number. They can be used alone or in combination of at least two thereof. A mixing proportion thereof is more preferably 0.01–0.5 parts by weight on the basis of 100 parts by weight of the polyacetal resin composition.

In this case, the alkali metal oxide includes, for example, $Na_2O$, $K_2O$ etc., the alkaline earth metal oxide includes, for example, MgO, CaO, etc., and the oxides of trivalent and tetravalent elements include, for example, $Al_2O_3$, $SiO_2$, $TiO_2$, etc. The ion adsorbent comprising, as main components, at least two oxides selected from these oxides includes, for example, $2.5\ MgO.Al_2O_3.nH_2O$, $2MgO.6SiO_2.nH_2O$, $Al_2O_3.9SiO_2.nH_2O$, $Al_2O_3.Na_2O.2CO_3.nH_2O$, $Mg_{0.7}\ Al_{0.3}\ O_{1.15}$, $Mg_{0.75}\ Al_{0.25}\ O_{1.125}$, etc.

In the following general formula:

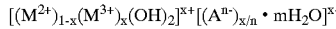

$M^{2-}$ includes, for example, $Mg^{2+}$, $Mn^{2+}$, $Fe^{2+}$, $Co^{2+}$, $Ni^{2+}$, $Cu^{2-}$, $Zn^{2-}$, etc.; $M^{3+}$ includes, for example, $Al^{3+}$, $Fe^{3+}$, $Cr^{3+}$, $Co^{3+}$, $In^{3+}$, etc; $A^{n-}$ includes, for example, $OH^-$, $F^-$, $Cl^-$, $Br^-$, $NO_3^-$, $CO_3^-$, $SO_4^-$, $Fe(CN)_6^{3-}$, $CH_3COO^-$, oxalate ion, salicylate ion, etc., particularly preferably $CO_3^-$ and $OH^-$. Specific examples include natural hydrotalcite shown by $Mg_{0.75}.Al_{0.25}\ (OH)_2(CO_3)_{0.125}.H_2O$ and synthetic hydrotalcites shown by $Mg_{4.5}\ Al_2(OH)_{13}CO_3.3.5\ H_2O$, $Mg_{4.3}\ Al_2(OH)_{12.6}\ CO_3$, etc.

Weather-resistant (light) stabilizer is preferably at least one member selected from the group consisting of benzotriazole-based compounds, oxalic anilide-based compounds and hindered amine-based compounds.

Benzotriazole-based compounds include, for example, 2-(2'-hydroxy-5'-methyl-phenyl) benzotriazole, 2-(2'-hydroxy-3,5-di-t-butyl-phenyl) benzotriazole, 2-[2'-hydroxy-3,5-bis(a,a-dimethylbenzyl) phenyl] benzotriazole, 2-(2'-hydroxy-3,5-di-t-amylphenyl) benzotriazole, 2-(2'-hydroxy-3,5-di-isoamyl-phenyl) benzotriazole, 2-[2'-hydroxy-3,5-bis(α,α-dimethylbenzyl)phenyl]-2H-benzotriazole, 2-(2'-hydroxy-4'-octoxyphenyl) benzotriazole, etc. Oxalic anilide-based compounds include, for example, 2-ethoxy-2'-ethyloxalic acid bisanidide, 2-ethoxy-5-t-butyl-2'-ethyloxalic acid bisanilide, 2-ethoxy-3'-dodecyloxalic acid bisanilide, etc. These compounds can be used alone or in combination of at least two thereof.

Hindered amine-based compounds include, for example, 4-acetoxy-2,2,6,6-tetramethylpiperidine, 4-stearoyloxy-2,2,6,6-tetramethylpiperidine, 4-acryloxy-2,2,6,6-tetramethylpiperidine, 4-(phenylacetoxy)-2,2,6,6-tetramethylpiperidine, 4-benzoyloxy-2,2,6,6-tetramethylpiperidine, 4-methoxy-2,2,6,6-tetramethylpiperidine, 4-stearyloxy-2,2,6,6-tetramethylpiperidine, 4-cyclohexyloxy-2,2,6,6-tetramethylpiperidine, 4-benzyloxy-2,2,6,6-tetramethylpiperidine, 4-phenoxy-2,2,6,6-tetramethylpiperidine, 4-(ethylcarbamoyloxy)-2,2,6,6- tetramethylpiperidine, 4-(cyclohexylcarbamoyloxy)-2,2,6,
6-tetramethylpiperidine, 4-(phenylcarbamoyloxy)-2,2,6,6-
tetramethylpiperidine, bis(2,2,6,6-tetramethyl-4-piperidyl)-
carbonate, bis(2,2,6,6-tetramethyl-4-piperidyl)oxalate, bis
(2,2,6,6-tetramethyl-4-piperidyl)-malonate, bis(1,2,2,6,6-
pentamethyl-4-piperidinyl)sebacate, bis(N-methyl-2,2,6,6-
tetramethyl-4-piperidinyl)sebacate, bis( 2,2,6,6-tetramethyl-
4-piperidyl)-sebacate, bis(2,2,6,6-tetramethyl-4-piperidyl)-
adipate, bis(2,2,6,6-tetramethyl-4-piperidyl)-terephthalate,
1,2-bis(2,2,6,6-tetramethyl-4-piperidyloxy)-ethane, α,α'-bis
(2,2,6,6-tetramethyl-4-piperidyloxy)-p-xylene, bis(2,2,6,6-
tetramethyl-4-piperidyl)-tolylene-2,4-dicarbamate, bis(2,2,
6,6-tetramethyl-4-piperidyl)-hexamethylene-1,6-
dicarbamate, tris(2,2,6,6-tetramethyl-4-piperidyl)-benzene-
1,3,5-tricarboxylate, tris(2,2,6,6-tetramethyl-4-piperidyl)-
benzene-1,3,4-tricarboxylate, 1-[2-{3-(3,5-di-t-butyl-4-
hydroxyphenyl)propionyloxy}butyl]-4-[3-(3,5-di-t-butyl-4-
hydroxyphenyl)propionyloxy]2,2,6,6-
tetramethylpiperidine, condensate of 1,2,3,4-
butanetetracarboxylic acid, 1,2,2,6,6-pentamethyl-4-
piperidinol and β,β,β',β'-tetramethyl-3,9-[2,4,8,10-
tetraoxaspiro(5,5)undecane]diethanol, etc. The hindered
amine-based light stabilizers can be used alone or in com-
bination of at least two thereof.

Above all, preferable weather-resistant stabilizers include
2-[2'-hydroxy-3,5-bis(α,α-dimethylbenzyl)phenyl] benzot-
riazole. 2-(2'-hydroxy-3,5-di-t-butylphenyl) benzotriazole,
2-(2'-hydroxy-3,5-di-t-amylphenyl) benzotriazole, bis(1,2,2,
6,6-pentamethyl-4-piperidinyl) sebacate, bis-(N-methyl-2,2,
6,6-tetramethyl-4-piperidinyl) sebacate, bis(2,2,6,6-
tetramethyl-4-piperidinyl) sebacate, and a condensate of
1,2,3,4-butanetetracarboxylic acid, 1,2,2,6,6-pentamethyl-4-
piperidinol and β,β,β',β'-tetramethyl-3,9-[2,4,8,10-
tetraoxaspiro(5,5) undecane] diethanol. It is preferable to
use 0.1–1 part by weight of the weather-resistant (light)
stabilizer on the basis of 100 parts by weight of the poly-
acetal resin composition.

Mold-releasing agent includes, for example, alcohol, fatty
acid and esters thereof, polyoxyalkylene glycol, olefin com-
pounds having an average degree of polymerization of
10–500, silicones, etc. Above all, ethylene glycol difatty
acid esters derived from fatty acids having 12–22 carbon
atoms are preferable. Particularly preferable are ethylene
glycol distearate, ethylene glycol dipalmitate and ethylene
glycol diheptadecylate. A mixing proportion of at least two
of ethylene glycol difatty acid esters derived from fatty acids
having 12–22 carbon atoms is more preferably 0.005–0.9
parts by weight on the basis of 100 parts by weight of the
polyacetal resin composition.

Crystal nucleating agent includes, for example, boron
nitride, talc, mica, alumina, boric acid compounds, etc. A
mixing proportion thereof is more preferably 0.01–0.1 parts
by weight on the basis of 100 parts by weight of the
polyacetal resin composition.

In the present invention, the present polyacetal resin
composition can be further admixed, within such a range as
not to deteriorate the effect of the present invention, with a
reinforcing agent such as inorganic fillers, glass fibers, glass
beads, carbon fibers, etc.; an electroconductive material such
as electroconductive carbon black, metal powders, fibers,
etc.; a thermoplastic resin such as polyolefin resin, acrylic
resin, styrene resin, polycarbonate resin, uncured epoxy
resin or their modified resins, etc.; and a thermoplastic
elastomer such as polyurethane-based elastomer, polyester-
based elastomer, polystyrene-based elastomer, polyamide-
based elastomer, etc. A mixing proportion thereof is prefer-
ably 10–40 parts by weight on the basis of 100 parts by
weight of the polyacetal resin composition.

The present polyacetal resin composition can be further
admixed with an inorganic pigment such as zinc sulfide,
titanium oxide, barium sulfide, Titan Yellow, Cobalt Blue,
etc.; an organic pigment such as condensed azo series,
perinone series, phthalocyanine series, monoazo series, etc.,
and so on. A mixing proportion of these pigments is 0–5
parts by weight, preferably 0.1–1 part by weight on the basis
of 100 parts by weight of the polyacetal resin composition.
A proportion of more than 5 parts by weight is not
preferable, because the heat stability will be lowered.

Moldings

As so far described above, the present invention provides
a polyacetal resin composition with largely improved tough-
ness and creep resistance without deteriorating advantages
of the polyacetal resin such as high rigidity and distin-
guished moldability and processability. Furthermore, to uti-
lize such distinguished characteristics, the present invention
provides moldings obtained by injection molding, extrusion
molding, blow molding or press molding of the polyacetal
resin composition. The present polyacetal resin composition
has good moldability and processability and thus is particu-
larly suitable for injection molding. This is characteristic of
the present invention.

The present polyacetal resin moldings provide mecha-
nism parts such as gears, cams, sliders, levers, arms,
clutches, hinges, shafts, bearings, key stems, key tops,
shutters, reels, parts fitting with and sliding on lead screws
for driving pickups of optical disc drive, gears for rotating
lead screws, rack gears for driving pickups, gears fitting with
and driving rack gears, etc., outsert molding resin parts,
insert molding resin parts, chassis, trays and side plates.

These parts are particulary suitable for use in OA equip-
ment such as printers, copiers etc.; camera or video equip-
ment such as VTR (Video Tape Recorder) and video movie,
digital video camera, camera, digital camera; music, picture
or information equipment such as cassette player, DAT
(Digital Audio Tape), LD (Laser Disk), MD (Mini Disk), CD
(Compact Disk) [including CD-ROM (Read Only Memory),
CD-R (Recordable) and CD-RW (Rewritable)], DVD
(Digital Video Disk) [including DVD-ROM, DVD-R, DVD-
RW, DVD-RAM (Random Access Memory) and DVD
Audio]; other optical disk drives, MFD (Micro Floppy
Disk), MO (Magnet Optical Disk), navigation system,
mobile personal computer, etc.; communication equipment
such as portable telephone, facsimile, etc.; automobile inte-
rior and extorior parts such as fuel-related parts (e.g. as
gasoline tanks, fuel pump modules, valves, gasoline tank
flanges, etc.); door-related parts (e.g. door locks, door
handles, window regulators, speaker grills, etc.); seat belt-
related parts (e.g. seat belt slip rings, press buttons, etc.)
combination switch parts, switches and grips; disposable
cameras; toy gears; fastners; chains; conveyors; buckles;
rollers; reduction equipment; joints; vending machines; fur-
niture; musical instruments; furniture-housing facility-
related parts such as sach rollers, etc.; sport article parts such
as ski bindings, hooks, etc.

The present polyacetal resin moldings have distinguished
toughness and creep resistance and thus are suitable for use
in at least one of automobile interior and exterior parts
requiring these characteristics, selected from the group con-
sisting of fuel-related parts such as gasoline tanks, fuel pump
modules, valves, gasoline tank flanges, etc.; door-related
parts such as door locks, door handles, window regulators,
speaker grills, etc.; seat belt-related arts such as seat belt slip
rings, press buttons, etc.; combination switch parts; and
grips, and are also suitable for use in machinery parts such
as chains, conveyers, rollers, reduction equipment, joints, etc.; furniture-housing facility-related parts such as sach rollers, etc.; sport article parts such as ski bindings, hooks; toy gears, etc.

The present polyacetal resin composition and its moldings have a higher effect on improvement of the toughness and creep resistance than that of the conventional polyacetal resin.

DESCRIPTION OF PREFERRED EMBODIMENTS

The present invention will be described below, referring to Examples, where the terms and testing procedures used in Examples and Comparative Examples are defined as follows:

(1) Melt Index (MI: g/10 min.):
Measured at 190° C. and 2,160 g by MELT INDEXER, made by Toyo Seiki K.K. according to ASTM-D1238.

(2) Melting point (° C.):
A sample is once melted by heating up to 200° C. and then cooled down to 100° C., and peak temperature of exothermic spectra generated in the course of reheating at a rate of 2.5° C./min. is measured as a melting point by a differential calorimeter (DAC-2C made by Perking Elmer Instruments, Inc.).

(3) Contents of 2-methyl-1,3-dioxolan, 1,4-dioxolan and acetaldehyde in 1,3-dioxolan (ppm by weight):
determined by gas chromatography provided with a capillary column (Polaplot Q, made by GL Science), using a hydrogen flame ionization detector.

(4) Content of peroxide in 1,3-dioxolan:
40 ml of isopropyl alcohol, 10 ml of a saturated sodium iodide solution (solution of NaI in isopropyl alcohol), 2 ml of acetic acid and 25 g of 1,3-dioxolan are added to a flask, followed by refluxing at 100° C. for about 5 minutes. Then, the mixture in the flask is titrated with 0.01 N sodium thiosulfate until the color of the mixture changes from yellow to colorless (let the amount of the titrant used be "A ml"). As a blank titration, the same operation as above is carried out without using 1,3-dioxolan (let the amount of the titant used be "B ml"). An amount of peroxide in 1,3-dioxolan can be calculated by the following equation:

Amount of peroxide (in terms of hydrogen peroxide, ppm)=(A−B)×17×0.01/(25×1,000)×10$^6$ (5) Concentrations of methyl alcohol, water and formic acid (ppm by weight):
Methyl alcohol is determined by gas chromatography provided with a glass column packed with Gaschropack 55 (made by GL Science), using a hydrogen flame ionization detector; water is determined by a Karl-Fischer aquameter; and formic acid is determined by neutralization titration with potassium hydroxide.

(6) Analysis of main chain composition of polyacetal copolymer:
When 5 g of polyacetal copolymer is heated in an aqueous 1 N hydrochloric acid solution at 120° C. for two hours, all the oxymethylene units are converted to formaldehyde and the oxyalkylene units to alkylene glycols. By quantitative determination of the alkylene glycols by gas chromatography provided with a glass column packed with Gachropack 55 (made by GL Science), using a hydrogen flame ionization detector, "W" which shows sequence of oxyalkylene units in polyacetal copolymer, proportion of the oxyalkylene units at w=1 and amount of inserted oxalkylene units are determined.

(7) Tensile elongation (%):
A test piece is prepared by an injection molding machine, model IS-80A, made by Toshiba Corp. under the following conditions and subjected to measuremernt according to ASTM-D638:
Cylinder temperature: 200° C.
Injection pressure: 5.9 MPa
Injection time: 15 sec.
Cooling time: 25 sec.
Mold temperature: 70° C.

(8) Creep resistance:
A rectangular test piece, 110 mm×6.5 mm×3 mm, is prepared by an injection molding machine, model IS-80a, made by Toshiba Corp, under the following conditions:
Cylinder temperature: 200° C.
Injection pressure: 5.9 MPa
Injection time: 15 sec.
Cooling time: 25 sec.
Mold temperature: 70° C.

The test piece is left standing in air at 80° C. under a tensile stress of 20 Mpa to measure time require for breakage of test piece. The longer the time required for breakage of test piece, the better the creep resistance.

(a) Units "%" and "ppm":
All by weight, unless otherwise specified.

Polyacetal Copolymer Preparation

A biaxial paddle-type continuous polymerization reactor with a jacket for heat medium was adjusted to 80° C., and trioxane, 1,3-dioxolan (comonomer) and a chain transfer agent were continuously added thereto. Then, boron trifluoride di-n-butyl etherate was continuously added thereto as a polymerization catalyst to conduct polymerization. Trioxane was added at a rate of 4 kg/hr. A 1 wt. % boron trifluoride di-n-butyl etherate in cyclohexane as the polymerization catalyst was added at a rate of 14.96 g/hr so that boron trifluoride can be in a proportion of $1.7 \times 10^{-5}$ moles to one mole of trioxane. 1,3-dioxolan containing 153 ppm of 2-methyl-1,3 dioxolan, 78 ppm of 1,4-dioxane, 121 ppm of acetaldehyde, 3 ppm of peroxide and further 200 ppm of tetrakis [methylene-3-(3',5'-di-t-butyl-4'-hydroxyphenyl) propionate] (IRGANOX 1010, made by CibaGeigy) as an antioxant was added in an amount given in Table 1. Chain transfer agents were selected from the following (1)–(3):

(1) Methylal: $CH_3OCH_2OCH_3$ (2) Hydrogenated polybutadiene, hydroxyethylated at both ends, which is liquid at 23° C. and 1 atm, represented by the following formula:

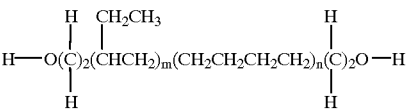

wherein m=80 mol %, n=20 mol %, ($CH_2CH_2CH_2CH_2$) units are present at random with respect to [$C(CH_2CH_3)HCH_2$] units, number average molecular weight: 2,390, iodine value: 18 g–$I_2$/100 g and Mw/Mn=1.5;

(3) Hydrogenated polybutadiene, hydroxyethylated at one end, which is liquid at 23° C. and 1 atm, represented by the following formula:

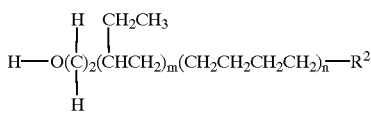

where m=80 mol %, n=20 mol %, (CH$_2$CH$_2$CH$_2$CH$_2$) units are present at random with respect to [C(CH$_2$CH$_3$)HCH$_2$] units, number average molecular weight: 2,400, iodine value: 17 g–I$_2$/100 g, Mw/Mn=1.5, and R$_2$ is a group selected from the group consisting of methyl, ethyl, n-propyl and n-butyl.

Kinds and amounts of added chain transfer agents are summarized in Table 1. In the total mixture of trioxane, 1,3-dioxolan and chain transfer agent, water concentration was 7–9 ppm by weight, methyl alcohol concentration was 5–10 ppm by weight, and formic acid concentration was 4–8 ppm by weight, which was 9.2–13.4 ppm in terms of water concentration.

Polyacetal copolymer discharged from the polymerization reactor was put into an aqueous 0.1% triethylamine solution to deactivate the polymerization catalyst. The deactivated polyacetal copolymer was filtered through a centrifuge, and then one part by weight of an aqueous solution containing hydroxylated choline formate (trimethyl-2-hydroxyethylammonium formate) as a quaternary ammonium compound was added to 100 parts by weight of polyacetal copolymer, followed by uniform mixing and drying at 120° C. An amount of added hydroxylated choline formate was set to 20 ppm by weight in terms of nitrogen amount by adjusting a concentrtion of hydroxylated choline formate in the aqueous solution containing hydroxylated choline formate to be added.

Dried polyacetal copolymer was fed to a biaxial screw type extruder with a vent, and 0.5 parts by weight of water was added to 100 parts by weight of molten polyacetal copolymer in the extruder to decompose unstable terminal groups at an extruder temperature of 200° C. for a residence time of 7 minutes in the extruder. Polyacetal copolymer whose unstable terminal groups were decomposed was devolatized under a vent vacuum degree of 2.7 kPa, and extruded from the dicepart of the extruder as a strand, followed by pelletization.

100 parts by weight of the pellets were admixed with 0.3 parts by weight of triethyelene glycol—bis-[3-(3-t-butyl-5-methyl-4-hydroxyphenyl) propionate] (IRGANOX 245, made by Ciba-Geigy), 0.05 parts by weight of nylon 66, 0.1 part by weight of calcium distearate, 0.05 parts by weight of calcium dipalmitate, 0.025 parts by weight of ethylene glycol distearate, 0.005 parts by weight of ethylene glycol dipalmitate and 0.01 part by weight of synthetic hydrotalcite represented by Mg$_{4.3}$ Al$_2$(OH)$_{12.6}$CO$_3$ and melt-kneaded in a uniaxial extruder with a vent, whereby polyacetal copolymer pellets were obtained.

Table 1 summarizes amounts of used 1,3-dioxolan, kinds and amount of used chain transfer agents, proportion of inserted oxyalkylene units in the resulting polyacetal copolymer, MI and melting point, and kinds of polyacetal copolymer [contents of the present polyacetal copolymers (D), (E) and (F) (% by weight)]. Number of prepared polyacetal copolymers were total 14, and a proportion of w=1, which shows sequence of oxyalkylene units, was found to be 98% by mole or more. After drying these pellets at 80° C. for 3 hours, polyacetal copolymers (1)–(8) were evaluated as the present polyacetal copolymer (A) having MI<1 g/10 min. and polyacetal copolymers (9)–(14) were evaluated as the present polyacetal copolymer (B) of MI=1–100 g/10 min.

TABLE 1

| Kinds of polyacetal copolymer | Rate of added 1,3-dioxolane (g/Hr) | Kinds of chain transfer agent | Rate of added chain transfer agent (g/Hr) | Proportion of inserted oxyalkylene units (moles per 100 moles of oxymethylene units) | MI (g/10 min.) | Melting point (° C.) | Contents of polyacetal copolymer (D), (E) and (F) |
|---|---|---|---|---|---|---|---|
| (1) | 34.5 | ① | 0.8 | 0.42 | 0.12 | 168.3 | (D) 100% |
| (2) | 39.5 | ① | 1.33 | 0.46 | 0.54 | 167.5 | (D) 100% |
| (3) | 34.5 | ① | 1.49 | 0.41 | 0.74 | 168.2 | (D) 100% |
| (4) | 167.7 | ① | 1.01 | 1.93 | 0.25 | 158.3 | (D) 100% |
| (5) | 143.0 | ① + ② | ① 0.28 ② 30 | 1.73 | 0.71 | 160.1 | (D) 22% (E) 78% |
| (6) | 162.8 | ① + ② | ① 1.03 ② 4.5 | 2.06 | 0.64 | 157.9 | (D) 87% (E) 13% |
| (7) | 133.2 | ① + ② + ③ | ① 0.90 ② 3 ③ 1.5 | 1.60 | 0.45 | 161.3 | (D) 87% (E) 9% (F) 4% |
| (8) | 32.1 | ① + ② | ① 0.86 ② 4.5 | 0.38 | 0.38 | 169.0 | (D) 85% (E) 15% |
| (9) | 150.5 | ① | 1.90 | 1.83 | 2.5 | 159.2 | (D) 100% |
| (10) | 157.9 | ① | 1.14 | 1.93 | 5.3 | 158.3 | (D) 100% |
| (11) | 138.1 | ① | 1.37 | 1.67 | 9.2 | 160.5 | (D) 100% |
| (12) | 128.3 | ① | 4.36 | 1.53 | 29.3 | 161.2 | (D) 100% |
| (13) | 30.8 | ① | 2.84 | 0.37 | 8.2 | 169.5 | (D) 100% |
| (14) | 175.1 | ① + ② | ① 1.76 ② 9 | 2.13 | 3.2 | 157.3 | (D) 85% (E) 15% |

EXAMPLES 1–16 AND COMPARATIVE EXAMPLES 1–11

In Examples 1–15 and Comparative Examples 1–10, the aforementioned polyacetal copolymer pellets were mixed together in proportions given in Table 2 and injection molded to prepare test pieces, and MI, tensile elongation and creep resistance of the test pieces were evaluated. In Example 16, the pellets were mixed together in the same proportion as that of Example 4 and melt kneaded through a uniaxial extruder, and the resulting pellets were injection molded and the thus obtained test piece was subjected to evaluation in the same manner as above. In Comparative Example 11, the same evaluation was conducted on TENAC 3510, made by Asahi Kasei Kogyo K.K. Results are summarized in Table 2.

EXAMPLE 17

Two biaxial paddle-type continuous polymerization reactors of quite the same type with a jacket were used in parallel. In one of the polymerization reactors, polymerization was carried out under the condition (6) of Table 1, whereas in another polymerization reactor polymerization was carried out under condition the condition (13) of Table 1. Both polymerization were conducted in the same manner as described in the foregoing section *Polyacetal copolymer preparation*. Polyacetal copolymers discharged from the two polymerization reactors were put into an aqueous 0.1% triethylamine solution to deactivate the polymerization catalyst and conduct stirring and mixing at the same time. Operations following the deactivation were the same as described in the foregoing section *polyacetal copolymer preparation* to obtain desired polyacetal copolymer pellets. Results of evaluation are summarized in Table 2.

2. A polyacetal resin composition according to claim 1, wherein the melting points of Component (A) and Component (B) each are 157°–161° C. or the difference in melting point between Component (A) and Component (B) is not less than 7° C.

3. A polyacetal resin composition according to claim 1 or 2, wherein the composition comprises 40–80% by weight of Component (A) and 60–20% by weight of Component (B).

4. A polyacetal resin composition according to claim 1, wherein the melt index of Component (A) is 0.1–0.8 g/10 min.

5. A polyacetal resin composition according to claim 1, wherein the melt index Component (B) is 2.0–30 g/10 min.

6. A polyacetal resin composition according to claim 1, wherein the melt index of Component (B) is 2.5–10 g/10 min.

7. A polyacetal resin composition according to claim 1, wherein the polyacetal resin composition has a melt index of 1.0–3 g/10 min.

TABLE 2

| | Polyacetal copolymer (A) | | Polyacetal copolymer (B) | | MI of test piece | Tensile elongation | Creep resistance |
|---|---|---|---|---|---|---|---|
| | Kind | wt. % | Kind | wt. % | (g/10 min.) | (%) | (Hr) |
| Example 1 | (1) | 30 | (11) | 70 | 1.20 | 153 | 1690 |
| Example 2 | (2) | 50 | (11) | 50 | 1.61 | 174 | 1740 |
| Example 3 | (2) | 40 | (9) | 60 | 1.23 | 195 | 1910 |
| Example 4 | (3) | 70 | (10) | 30 | 1.18 | 177 | 1830 |
| Example 5 | (3) | 80 | (12) | 20 | 1.17 | 165 | 1800 |
| Example 6 | (3) | 60 | (14) | 40 | 1.22 | 190 | 1730 |
| Example 7 | (4) | 40 | (13) | 60 | 1.23 | 172 | 1810 |
| Example 8 | (4) | 30 | (9) | 70 | 1.02 | 150 | 1650 |
| Example 9 | (5) | 80 | (12) | 20 | 1.12 | 146 | 1550 |
| Example 10 | (5) | 40 | (11) | 60 | 2.50 | 155 | 1630 |
| Example 11 | (6) | 40 | (9) | 60 | 1.34 | 212 | 2010 |
| Example 12 | (6) | 50 | (13) | 50 | 1.76 | 208 | 1980 |
| Example 13 | (7) | 50 | (10) | 50 | 1.21 | 200 | 1810 |
| Example 14 | (7) | 40 | (12) | 60 | 2.71 | 151 | 1680 |
| Example 15 | (8) | 40 | (14) | 60 | 1.13 | 164 | 1780 |
| Example 16 | (3) | 70 | (10) | 30 | 1.19 | 173 | 1850 |
| Example 17 | (6) | 50 | (13) | 50 | 1.78 | 204 | 1990 |
| Comp. Example 1 | (2) | 50 | (13) | 50 | 1.56 | 135 | 1530 |
| Comp. Example 2 | (8) | 50 | (11) | 50 | 1.25 | 205 | 2040 |
| Comp. Example 3 | (1) | 20 | (10) | 80 | 1.55 | 93 | 920 |
| Comp. Example 4 | (3) | 20 | (9) | 80 | 1.88 | 85 | 690 |
| Comp. Example 5 | (6) | 25 | (13) | 75 | 3.44 | 79 | 730 |
| Comp. Example 6 | (5) | 20 | (10) | 50 | 3.13 | 83 | 840 |
| Comp. Example 7 | (8) | 95 | (11) | 5 | 0.42 | 66 | 530 |
| Comp. Example 8 | (2) | 100 | — | — | 0.54 | 35 | 380 |
| Comp. Example 9 | (6) | 100 | — | — | 0.64 | 43 | 350 |
| Comp. Example 10 | — | — | (9) | 100 | 2.5 | 75 | 450 |
| Comp. Example 11 | TENAC 3510 | | | | 2.8 | 71 | 410 |

What is claimed is:

1. A polyacetal resin composition, which comprises 30–90% by weight of polyacetal copolymer having a melt index of less than 1 g/10 min. as Component (A) and 70–10% by weight of polyacetal copolymer having a melt index of 1–100 g/10 min. as Component (B), melting points of Component (A) and Component (B) each being 155°–162° C. or difference in melting point between Component (A) and Component (B) being not less than 6° C.

8. A polyacetal resin composition according to claim 1, wherein Component (A) comprises at least one member selected from the group consisting of the following polyacetal copolymers (D), (E) and (F):

(D) polyacetal copolymer, which is a polyacetal copolymer in such a structure that 0.1–5 moles of oxyalkylene units represented by the following formula is inserted into a polymer of oxymethylene repeat unit (—CH$_2$O—) on the basis of 100 moles of the oxymethylene units, where the terminal groups of the polyacetal copolymer are at least one kind of groups selected from the group consisting of an alkoxy group, a hydroxyalkoxy group and a formate group:

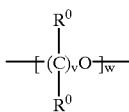

wherein $R^0$s are selected from hydrogen, an alkyl group a substituted alkyl group, an aryl group and a substituted aryl group, and $R^0$s may be the same or different from one another; v is an integer selected from 2 to 6; w is an integer of 1 or more; and a proportion of the oxyalkylene unit at w=1 is not less than 95% by mole to the entire oxyalkylene units, (E) polyacetal copolymer in such a structure that at least one hydrogenated liquid polybutadiene residue, hydroxyalkylated at both ends, with a number average molecular weight of 500–10,000, represented by the following general formula (1) is inserted into one molecule of polyacetal copolymer (D):

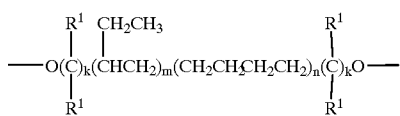 (1)

wherein m=70–98% by mole, n=2–30% by mole and m+n=100% by mole; $(CH_2CH_2CH_2CH_2)$ units exist at random or in blocks with respect to $[C(CH_2CH_3)HCH_2]$ units and the $[C(CH_2CH_3)HCH_2]$ units and the $(CH_2CH_2CH_2CH_2)$ units may contain unsaturated bonds having an iodine value of not more than 20 g–$I_2$/100 g; k is an integer selected from 2 to 6, and two ks may be the same or different from each other; $R^1$s are selected from hydrogen, an alkyl group, a substituted alkyl group, an aryl group and a substituted aryl group and may be the same or different from one another, and (F) polyacetal copolymer in such a structure that one end of polyacetal copolymer (D) is represented by the following general formula (2):

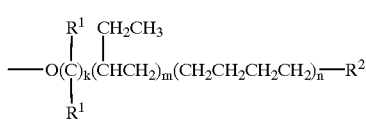 (2)

where m, n, k and $R^1$ have the same meanings as defined in the general formula (1); $(CH_2CH_2CH_2CH_2)$ units exist at random or in blocks with respect to $[C(CH_2CH_3)HCH_2]$ units, and the $[C(CH_2CH_3)HCH_2]$ units and the $(CH_2CH_2CH_2CH_2)$ units may contain unsaturated bonds having an iodine value of not more than 20 g–$I_2$/100 g; and $R^2$ is a group selected from a methyl group, an ethyl group, an n-propyl group and n-butyl group.

9. A polyacetal resin composition according to claim 8, wherein Component (A) contains at least one of (E) and (F), and sum total of at least one of (E) and (F) is not less than 10% by weight on the basis of entire Component (A).

10. A polyacetal resin composition according to claim 1, wherein 0.005–5 parts by weight of at least one member selcted from the group consisting of an antioxidant, a formaldehyde-reactive nitrogen-containing polymer or compound, a formic acid-trapping agent, a weather-resistant (light) stabilizer, a mold-releasing (lubricating) agent and a crystal nucleating agent is further contained on the basis of 100 parts by weight of the polyacetal resin composition.

11. A polyacetal resin composition according to claim 10, wherein the antioxidant is a hindered phenol-based antioxidant.

12. A polyacetal resin composition according to claim 10 or 11, wherein the polymer containing formaldehyde-reactive nitrogen is polyamide resin.

13. A polyacetal resin composition according to claim 10, wherein the formic acid-trapping agent is at least two compounds selected from the group consisting of difatty acid calciums derived from fatty acids having 12–22 carbon atoms.

14. A polyacetal resin composition according to claim 10, wherein the formic acid-trapping agent is:

(I) an ion adsorbent whose principal component comprises at least two oxides consisting of at least one member selected from oxides of alkali metals and alkaline earth metals and at least one member selected from oxides of trivalent and tetravalent elements, or (II) at least one member selected from hydrotalcites represented by the following general formula:

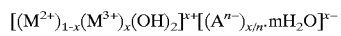

where $M^{2+}$ is a divalent metal, $M^{3+}$ is a trivalent metal, $A^{n-}$ is an anion of n valency (n: an integer of 1 or more), x is in a range of $0<x\leq0.33$, and m is a positive number.

15. A polyacetal resin composition according to claim 10, wherein the mold-releasing agent is at least two compounds selected from the group consisting of ethylene glycol difatty acid esters derived from fatty acids having 12–22 carbon atoms.

16. A process for producing a polyacetal resin composition according to claim 1, which comprises using two continuous bulk polymerization reactors in parallel, producing polyacetal copolymer (A) in one of the reactors while producing polyacetal copolymer (B) in the other reactor at the same time and mixing the polyacetal copolymers (A) and (B) discharged from the respective reactors together before or during post treatment.

17. A molding obtained by injection molding, extrusion molding, blow molding or press molding the polyacetal resin composition according to claim 1.

18. A molding according to claim 17, wherein the molding is at least one part selected from the group consisting of a mechanism part, an outsert molding resin part, an insert molding resin part, a chassis, a tray and a side plate.

19. A molding according to claim 18, wherein the mechanism part is at least one part selected from the group consisting of gears, cams, sliders, levers, arms, clutches, hinges, shafts, bearings, key stems, key tops, shutters and reels.

20. A molding according to claim 18, wherein the mechanism part is at least one part selected from the group consisting of parts fitting with and sliding on lead screws for driving pickups of optical disc drive, gears for rotating lead screws, rack gears for driving pickups and gears fitting with rack gears for driving the rack gears.

21. A molding according to claim 17, wherein the molding is a part for OA equipment.

22. A molding according to claim 17, wherein the molding is a part for camera or video equipment.

23. A molding according to claim 17, wherein the molding is a part for music, picture or information equipment.

24. A molding according to claim 17, wherein the molding is a part for communication equipment.

25. A molding according to claim 17, wherein the molding is an interior or exterior part for automobiles.

26. A molding according to claim 17, wherein the molding is a machinery part.

* * * * *